Figures 1, 2:
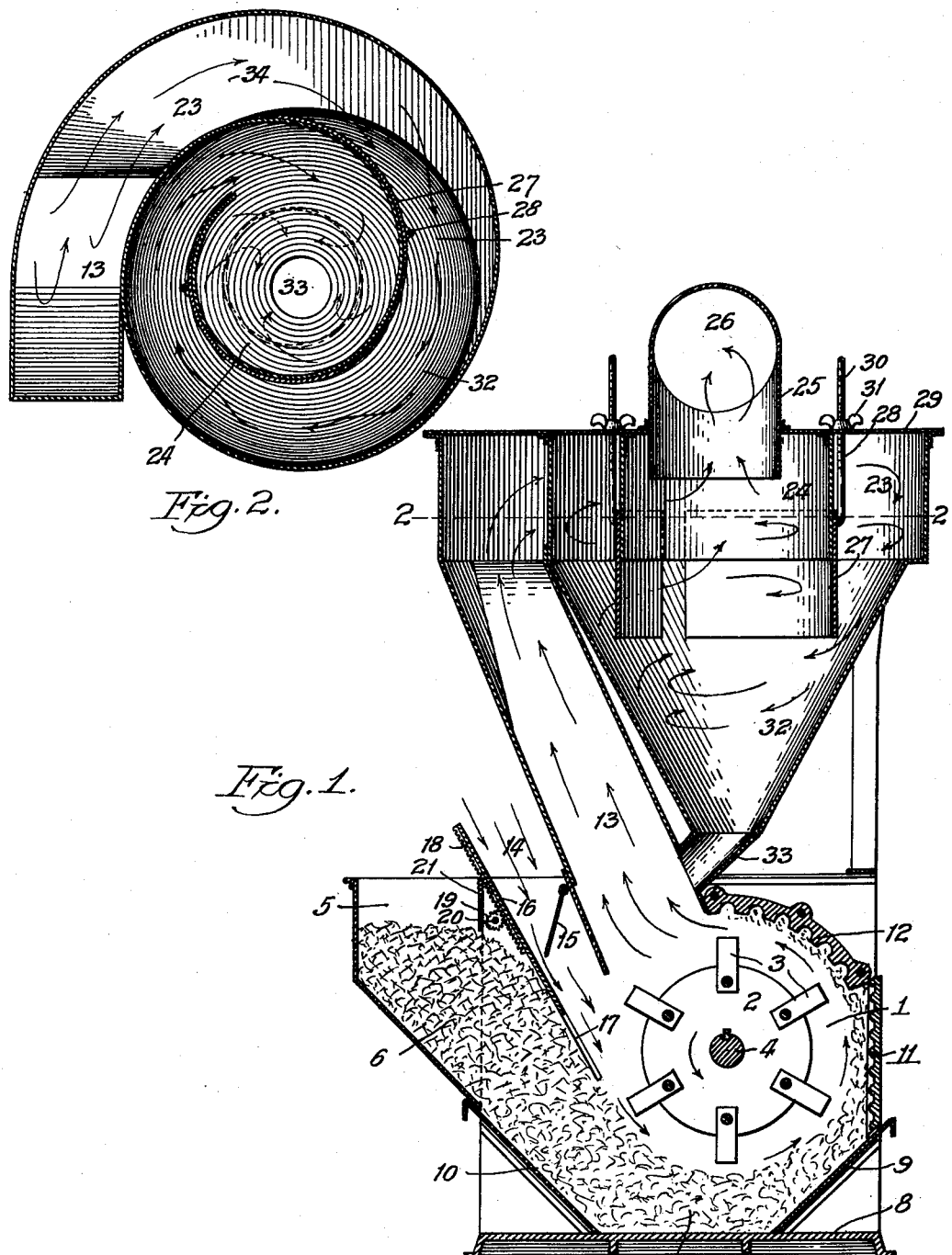

April 8, 1930.  H. G. LYKKEN  1,753,437
MATERIAL REDUCING AND MEANS THEREFOR
Filed Nov. 13, 1925

Inventor:
Henry G. Lykken,
by Wallace R. Lane.
Atty.

Patented Apr. 8, 1930

1,753,437

UNITED STATES PATENT OFFICE

HENRY G. LYKKEN, OF MINNEAPOLIS, MINNESOTA

MATERIAL REDUCING AND MEANS THEREFOR

Application filed November 13, 1925. Serial No. 68,750.

The present invention relates to the reducing of materials to a fine state and also the conditioning of the same for use.

Among the objects of the invention is to provide a novel device for and a novel method of reducing materials, and separating the finer particles in selected grade for use, and the re-reducing of the heavier and larger particles.

The invention is applicable to the reducing of any reducible material, but for illustration it is herein described as a fuel device and therefore has for an object the provision of a novel fuel carburetor in which the fuel is converted to a fluidal condition and mixed with a supporter of combustion, such as air, in the proportions for efficient and complete combustion at the place of use or combustion. It also comprehends the idea of utilizing the supporter, such as the air, to effect the reducing of the material by an act similar to fluid erosion, to effect the conveying of the reduced particles to a place of separation and also the separated particles to a place of use, and to effect the separating of the finer particles from the coarser and heavier particles, such that the air will form a part of the combustible mixture of the finer particles with the air.

Another object is to provide for controlling the rate and the nature of the reducing and also the rate and the nature of the separation. This may be effected by the causing of an air current at greater or less rate through the reducing and separating means and also by use of the means for varying or regulating the same. In other words, the amount of material reduced is proportionate to the amount of air drawn into and through the reducing means, such that the greater the draft effected at the outlet of the device, the greater the rate of the air current and hence the greater the amount of material reduced. Likewise the rate of flow of the air and suspended reduced particles in the separating means, will determine the grade and percentage of fines that will be separated and carried in the combustible mixture to the combustion locus. The degree of reducing and also separation depends upon the rate of flow of the air and amount of air passing through the device.

Other objects, advantages, features and capabilities are comprehended by the invention as will later appear and are inherently possessed thereby.

Referring to the drawings showing an embodiment of the invention, Fig. 1 is a vertical sectional view through a device constructed in accordance with the invention; and, Fig. 2 is a horizontal sectional view taken in a plane represented by line 2—2 in Fig. 1 of the drawings.

Referring more in detail to the drawings, the embodiment selected to illustrate the invention is shown as comprising a reducing chamber 1 in which is rotatably supported a rotor 2 having radial projections or arms 3, the rotor being driven by a shaft 4 having suitable bearings in the side walls of the chamber and operated from a suitable source of power. The chamber is large and provides ample space between the peripheral path of the outer ends of the arms 3 and the side walls of the chamber.

At one side of the chamber is provided a hopper 5 in which material 6 may be held and charged into the lower part 7 of the chamber, the material therein forming a bed of substantial thickness beneath the rotor. The lower end portion of the hopper communicates with the lower portion of the chamber 1 whereby the material 6 is fed by gravity into the lower part of the chamber and maintains the bed in the space 7 as the upper surface of the bed is being worn away by the action of the rotor and the air hereinafter more fully described.

The chamber 3 and the hopper 5 is suitably supported upon a base 8 and the lower part of the chamber 1 as well as the lower part of the hopper 5 are provided with openings normally closed by slide doors 9 and 10, these doors being of utility to permit the cleaning out of the lower part of the device.

Part of the side walls of the chamber may be provided with roughened or corrugated sections 11 and 12, the corrugations of which act as anchors for the retarding of the lower and outer layers or portions of the material being caused to move around the chamber in the direction of rotation of the rotor. It will be apparent from the disclosure that there is a substantial clearance between the outer ends of the arms 3 of the rotor and the anchoring surfaces of the sections 11 and 12.

At the upper part of the chamber 1 is provided an outlet passage 13 for the conveyance therethrough and discharge of a mixture of air and reduced particles, the latter being held in suspension in the stream of air passing upwardly in the passage 13. Between the hopper 5 and the passage 13 is provided an air inlet passage 14 extending downwardly and discharging tangentially with the peripheral surface of the ends of the arms 13 so that the air may enter into the region between the rotor and the surface of the material held in the chamber 1. The passage of the air through the passage 14 may be controlled by a gate or valve 15.

For the purpose of controlling the gravitational descent or charging of the material into the lower part of the chamber 1 the upper part of the hopper may be provided with a sliding gate or wall 16 located between the air inlet passage 14 and the hopper space 5, the sides of the gate being slidable in suitable slots 17 formed in the side walls of the device, and carrying a rack 18 in mesh with a pinion 19 carried upon a rotating shaft 20, the latter being suitably operated to cause the rack 18 and the gate 16 to slide to the desired position for controlling the feed or charge of the material into the chamber. The pinion 19 may be located in a space behind a protecting plate 21 provided across the upper part of the hopper 5.

The upper end of the passage 13 leads tangentially into a spiral chamber or channel 23 passing in the form of a spiral or involute to a central portion or eye 24. From the latter leads an outlet pipe 25 connected with a passage 26 leading to the place of use or combustion chamber of a furnace or boiler. Around the wall of the eye 24 is slidably fitted a control gate or sleeve 27 adapted to slide longitudinally of the eye portion and being connected to supporting rods 28 passing through suitable apertures provided in the top 29 of the separating device, the outward projecting threaded portions 30 of these rods carrying suitable adjusting thumb nuts 31 for regulating the vertical height of the sleeve 27 as clearly shown in Fig. 1 of the drawings. To the lower part of the channel 23 is connected the larger end of a cone-shaped chamber 32, the lower end of the chamber 32 being provided with a return passage 33 communicating with the lower part of the passage 13 and the upper portion of the chamber 1. It will be apparent that the upper or larger part of the conical chamber 32 is in communication with the lower open portion of the channel 23 for a large part of the length of the spiral chamber. That portion of the spiral chamber not located above the larger end of the conical chamber 32 is provided with a bottom wall 34 as shown in Fig. 2 of the drawings.

In operation, the device is loaded with material by placing the material in the hopper 5, and the gate 16 adjusted so that the material will flow by gravity downwardly into the lower part of the chamber 1. A bed of material is thus formed and maintained in the chamber space 17 below the rotor 2. The latter is rapidly rotated so as to cause a whirl of air within the chamber, but this will not have an effect upon the material until air is introduced through the passage 13 into the region or clearance space between the rotor periphery and the surface of the bed of material in the lower part of the chamber. This current of air may be effected by the effecting of a draft at the combustion chamber and through the passage 26 and thence through the separator and reducing chamber. The incoming stream of air through the passage 13 will be projected against the surface of the material in the bottom of the chamber and be drawn around the periphery of the rotor. The stream thus will cause an eroding or similar action upon the surface of the material bed and thus carry with it a certain amount of the particles of the material. The rotation of the rotor will also effect a cyclonic and centrifugal action upon such stream so that the layers nearer the rotor periphery will be traveling at a greater rate than the layers more remote therefrom, and the layers in contact with the walls of the rotor will be moving at a very slow rate or be maintained stationary, the anchoring surfaces of the sections 11 and 12 aiding for this purpose. As these layers of material are caused to move over each other and also owing to the centrifugal action of the rotor, there will be a radical stress outwardly upon such layers so that the inner layer will be rubbing or mulling over the adjacent outer layers so that there is a positive crushing of particle upon particle as the same are being entrained around the rotor and then caused to proceed from the surface of the rotor tangentially into the opening at the upper part of the chamber 1 and thence into the stream passing upwardly into the passage 13. It will be apparent from this that the material is caused to move for a little more than one-half the rotation of the rotor, although the rotor is spinning at a great rate with a mass of air swept with it and the arms 3 of the rotor. If no air is entering at 13, as when the gate 15 is closed, there is no entraining of the material and thus no reduction thereof, the mass of air within the chamber and operated upon by the rotor being carried around idly. Upon opening the gate 15 air will be drawn into the chamber in the form of a projecting stream which will be immediately entrained by the mass of air carried by the rotor and cause a sweeping or eroding to take place upon the surface of the material embedded in the chamber 1. From this it will be apparent that the amount of reduction may be controlled to the extent desired.

As the material is being gradually worn away from the surface of the same, compensation thereof may be effected by the gravitational movement of the charge of material in the hopper 5 so that the thickness or amount of material in the bed will be maintained at desired level for the proper taking away for reduction. If the charging or feeding is not sufficiently rapid, the gate or plate 16 may be raised.

A stream of air and suspended particles then pass upwardly through the passage 13 and into the spiral or involute passage 23 of the separating device. This will cause the stream to take a contracting rotating path above or in the large or open end of the conical chamber 32 such that centrifugal action of the particles will cast the larger and heavier particles toward the side walls of the conical chamber and then down to the lower part thereof. The finer particles will be carried with the stream toward the center of the chamber 32 and upwardly through the eye of the spiral or involute and into the outlet passages 25 and 26, this action being similar to that in a whirlpool or vortex.

If it be desired to have a very fine grade of particles fed to the place of use, the sleeve 27 may be lowered so as to give a longer path of movement of the stream in the chamber 32 and thus permitting a greater amount of the coarser and heavier particles to be returned to the lower part of the chamber 32 and hence effecting a finer grade of material passing upwardly through the passages 25 and 26. If the demand upon the fuel is greater and coarser material may be used the sleeve 27 may be raised by turning the thumb nuts 31, so that the path of whirl or cyclone in the upper part of the chamber 32 will be short, and the fines will not be quite as fine as before and a larger percentage of the fine fuel will pass with the air through the outlets 25 and 26.

The coarser and heavier particles accumulating or being collected in the lower part of the conical chamber 32 will pass downwardly through the passage 33 and return into the reducing chamber for further reduction. If any fine particles be carried down with the coarse particles and have given up any of their moisture, as they are discharged from the passage or spout 33, the upward draft of air and particles passing in the passage 13 will cause a slight amount of aspiration and catch up these fine particles and carry them again to the spiral passage for separation from the coarser particles and to pass with the other fine particles to the discharge outlet 26.

While I have herein described and upon the drawing illustrated a particular embodiment of the invention, it is to be understood that the latter is not limited thereto but comprehends other details, arrangements of parts, features and constructions without departing from the spirit thereof.

Having thus disclosed my invention, I claim:

1. A device for reducing materials, comprising a reducing chamber, and a charging chamber having communication with the lower part of the reducing chamber for feeding the material from the charging chamber to said lower part of said reducing chamber, means for drawing air continuously through the chamber, and means for causing the air to reduce the material in the chamber to a finely divided state by erosion.

2. A device for reducing materials, comprising a reducing chamber, a charging passage leading to the lower part of said chamber and adapted to hold and charge the material to be reduced, and means in the chamber for causing a fluid to act upon the material to reduce the same to a finely divided state by erosion.

3. A reducing device for materials, comprising a chamber, material holding and supplying means connected with the lower part of said chamber and adapted to form and maintain a bed of the material in said chamber, a rotor in the chamber above the surface of the bed of material for driving an eroding current of air against the material; and means at the upper part of said chamber for conducting reduced material entrained in the air from said chamber.

4. A reducing device for materials, comprising a chamber, material holding and supplying means connected with the lower part of said chamber and adapted to maintain a bed of material in said chamber, reducing means in said chamber and located to act upon the material at the surface of said bed, means at the upper part of said chamber for conducting reduced material from said chamber, and means for introducing a stream of air into said chamber in the region of action between said reducing means and said bed of material.

5. A reducing device for materials, comprising a reducing chamber, means for holding material to be reduced and for supplying the same to the lower part of said chamber, said means being adapted to maintain a bed of material in said chamber, means in said chamber for effecting reduction in the region of the surface of said bed of material, a discharge passage associated with said chamber and said reducing means for conducting the reduced material therefrom, and means for introducing a stream of air into said chamber in the region of action between said reducing means and said bed of material.

6. A reducing device for materials, comprising a reducing chamber, means for holding material to be reduced and for supplying the same to the lower part of said chamber, said means being adapted to maintain a bed of material in said chamber, means in said chamber for effecting reduction in the region of the surface of said bed of material, a discharge passage associated with said chamber and said reducing means for conducting the reduced material therefrom, and an air passage between said holding and supplying means and said discharge passage for introducing a stream of air into said chamber in said reducing region.

7. A reducing device for materials, comprising a reducing chamber, means for holding material to be reduced and for supplying the same to the lower part of said chamber, said means being adapted to maintain a bed of material in said chamber, means in said chamber for effecting reduction in the region of the surface of said bed of material, a discharge passage associated with said chamber and said reducing means for conducting the reduced material therefrom, an air passage between said holding and supplying means and said discharge passage for introducing a stream of air into said chamber in said reducing region, and means in said air passage for regulating the amount of air entering said chamber.

8. A reducing device for materials, comprising a reducing chamber, reducing means therein, means for holding material to be reduced and for supplying said material to the lower part of said chamber and to maintain a bed of material therein, and means for regulating the rate of supply of said material into said chamber.

9. A device for reducing materials, comprising a chamber in which the material is reduced, a rotor adapted to rapidly revolve in said chamber and having its periphery spaced from the walls of the chamber to provide a clearance space between the periphery of said rotor and said chamber walls whereby the material to be reduced is acted upon by fluid in said space, and means for supplying the material to the said space and for maintaining a quantity of material in said space.

10. A device comprising a reducing chamber, a reducing rotor therein, the walls of such chamber being spaced from the periphery of the rotor, said chamber having normally a bed of material in the lower part of the chamber and below the rotor, means for supplying the material into said chamber and maintaining said bed, an inlet for supplying air to the chamber between the rotor and the bed of material, and an outlet at the upper part of the chamber for the air and particles of reduced material in suspension therein.

11. A reducing device comprising a reducing chamber, a rotor in said chamber and operative out of contact with the material to be reduced in said chamber, means for supplying air into said chamber, said rotor operating to effect a cyclonic action of the air in the chamber for entraining the material and reducing the same by said action therefor and means for withdrawing the air to remove the reduced material entrained therein.

12. A reducing device comprising means for holding material to be reduced, a rotor operatively associated with said material, means for supplying air to said rotor, said rotor causing an air current which acts upon the material to abrade and reduce the same to a fine state, and means for withdrawing the material laden air.

13. A reducing device comprising means for holding a body of material to be reduced, an air inlet at one point of said means for action upon the surface of said body of material, and an outlet at another point, a rotor between said points and adapted to induce a current of air from said inlet to said outlet and to cause the current to entrain particles of the material from the body thereof and act thereon with force for reducing the same while being entrained and carried toward said outlet.

14. A reducing device comprising a reducing chamber and means therein for effecting reduction of material by causing a fluidal action in the chamber, a material hopper and feed duct for gravitationally supplying and maintaining a normal level of material in the lower part of the chamber whereby reduction of the material therein may be effected.

15. A method of reducing materials, comprising directing a stream of fluid over the surface of the material for eroding the material and entraining particles of material in the stream of fluid, producing a centrifugal action in the stream and entrained particles whereby the particles mull against each other to reduce their size, and conducting away the stream with the reduced particles.

16. A method of reducing materials, comprising the producing of a stream of fluid upon the surface of the material for eroding the material and entraining in the stream particles of the material, producing a centrifugal action in the stream and entrained particles whereby the particles mull against each other to reduce their size, and conducting away the stream with the reduced particles, impressing a centrifugal movement to said conducted stream and particles for separation of the fluid and fines from the heavier and larger particles.

17. A method of directing materials, comprising inducing an air current against the material for eroding the material and causing a reducing interaction among the particles of the material entrained by the air current, and conducting the material laden air current into a spiral path for separation of the finer particles by centripetal and gravitational forces.

18. A method of reducing materials, comprising inducing an air current against the material for abrading and reducing the material and entraining the particles of the material acted upon by the air current, and conducting the reduced particles in an air current into a separating means, causing said current and particles to whirl whereby centrifugal action caused the heavier and larger particles to fall and centripetal action causes the air and finer particles to rise, and conducting the latter to a place of use.

19. A method of reducing materials, comprising drawing an air current through a reducing chamber containing a bed of the material to be reduced, causing said current to abrade and erode the surface of the material to be reduced, and carrying away the reduced particles of the material in suspension in the air current.

20. A method of reducing materials, comprising drawing a current of air through a reducing chamber containing a bed of the material to be reduced, causing said current to reduce the material by erosion, imposing centrifugal stresses upon the particles of the material entrained in the air transverse to said current for causing a reduction among the entrained particles, and carrying the finer particles in suspension in an air current.

21. A method of reducing materials, comprising drawing a current of air through a reducing chamber containing a bed of the material to be reduced, causing said current to reduce the material by erosion, carrying the reduced particles of the material in suspension in the air, imposing centrifugal and centripetal action upon the material laden air for removing the heavier and larger particles, and conducting away the finer particles entrained in the air to a place of use.

In witness whereof, I hereunto subscribe my name to this specification.

HENRY G. LYKKEN.